United States Patent [19]

Yokota et al.

[11] Patent Number: 4,857,741

[45] Date of Patent: Aug. 15, 1989

[54] X-RAY INTENSIFYING SCREEN

[75] Inventors: Kazuto Yokota; Akihisa Saito, both of Yokohama, Japan

[73] Assignee: Kabushiki Kaisha Toshiba, Kawagawa, Japan

[21] Appl. No.: 31,140

[22] Filed: Mar. 30, 1987

[30] Foreign Application Priority Data

Mar. 31, 1986 [JP] Japan ................ 61-073416

[51] Int. Cl.⁴ .............................. C09K 11/78
[52] U.S. Cl. ................ 250/486.1; 252/301 AR
[58] Field of Search ............. 250/483.1, 486.1; 252/301.4 R

[56] References Cited

U.S. PATENT DOCUMENTS 4,225,653 9/1980 Brixner ........................ 250/483.1
4,387,141 6/1983 Patten ....................... 252/301.4 R
4,571,496 2/1986 Arakawa et al. ............... 250/486.1

FOREIGN PATENT DOCUMENTS 0202875 11/1986 European Pat. Off. .

OTHER PUBLICATIONS

Chem. Abst. vol. 105, No. 26 Dec. 1986, P. 532 abst. No. 234891e Antonov et al. . . . $Ba_3LaNb_3O_{12}$ . . .
Chem. Abst. vol. 104 No. 16 Apr. 1986, p. 566 abst No. 138607a Antonov et al., ". . . $Ba_3LaNb_3O_{12}$ . . . "
Chem. Abst. vol. 102, No. 6 Feb. 1985, p. 485 Abst. No. 53295f Evdokimov et al., ". . . $Ca_2Ln_{1-x}Nd_xTaO_6$".

Primary Examiner—Craig E. Church
Assistant Examiner—Richard Hanig
Attorney, Agent, or Firm—Finnegan, Henderson, Farabow, Garrett & Dunner

[57] ABSTRACT

This invention concerns an intensifying screen using a phosphor capable of emitting light under X-ray excitation. This intensifying screen is characterized by the fact that the phosphor layer in the intensifying screen comprises a first phosphor layer containing a phosphor represented by the general formula (I):

$$M_aLn_{1-x-(2/3)a}DO_4:XR^{3+} \tag{I}$$

(wherein M stands for at least one divalent metal element selected from the group consisting of Be, Mg, Ca, Sr, Ba, Zn, and Cd, Ln for at least one element selected from the group consisting of Y, Gd, La, and Lu, D for either or both of Ta and Nb, R for at least one member selected from the group consisting of Tm, Pr, Sm, Eu, Tb, Dy, Yb, and self-activators, a for a value satisfying the expression, $0 < a \leq 1$, and x for a valve satisfying the expression, $0 \leq x \leq 0.005$) and formed on the aforementioned substrate side and a second phosphor layer containing $CaWO_4$ and formed on the aforementioned protective layer side. Owing to this characteristic feature, intensifying screen enjoys improved granularity without any sacrifice of sensitivity or sharpness.

4 Claims, No Drawings

X-RAY INTENSIFYING SCREEN

The present application claims priority of Japanese Patent Application No. 61-73416 filed on Mar. 31, 1986.

FILED OF THE INVENTION AND RELATED ART STATEMENT

This invention relates to an X-ray intensifying screen using a phoshor capable of emitting light under radiant excitation.

In the practice of taking a radiograph, it is usual to take superpose a X-ray film on an intensifying screen.

This intensifying screen is produced by coating a phosphor layer and a relatively thin transparent protective layer capable of protecting the phosphor layer to be superposed sequentially in the order mentioned on a substrate. When a radiation, for example, an X-ray impinges on this intensifying screen, the phosphor layer emits light and sensitize the adjoining X-ray film. Not infrequently, the radiography using the intensifying screen of this kind is used for the purpose of medical diagonosis. It is required to decrease the dosage of radiation on a patient to the fullest possible extent and yet to produce a radiograph precise enough to permit highly reliable diagonosis.

Heretofore, in general, $CaWO_4$ has been used as the phosphor for the intensifying screen.

This $CaWO_4$ possesses satisfactory granularity. It nevertheless is so deficient in luminance as to require a notable addition to the thickness of the phosphor layer for the purpose of providing ample sensitivity. Thus, this phosphor has a disadvantage that its sharpness is not sufficient. In recent years, as phosphors promising high efficiency of light emission, the phosphors represented by the general formula (I):

(wherein M stands for at least one divalent metal element selected from the group consisting of Be, Mg, Ca, Sr, Ba, Zn, and Cd, Ln for at least one element selected from the group consisting of Y, Gd, La, and Lu, D for either or both of Ta and Nb, R for at least one member selected from the group consisting of Tm, Pr, Sm, Eu, Tb, Dy, Yb, and self-activators, a for a value satisfying the expression, $0 < a \leq 1$, and x for a value satisfying the expression, $0 \leq x \leq 0.05$) are now under development.

Such phosphor as just described possesses a satisfactory efficiency of light emission, provides high photographic sharpness and luminance for the intensifying screen, and enables the intensifying screen to be higher than the intensifying screen using $CaWO_4$ The intensifying screen using this phosphor, nevertheless, suffers from a disadvantage that the radiograph obtained therewith exhibits poor granularity and hinders accurate analysis for medical diagnosis. For medical diagnosis use, therefore, this phosphor cannot be justly rated as suitable.

OBJECT AND SUMMARY OF THE INVENTION

This invention has been initiated for the purpose of overcoming the disadvantage mentioned above and is aimed at providing a intensifying screen which enjoys improved granularity without any decrease of radiographic sensitivity or sharpness.

To be specific, the present invention is directed to a intensifying screen composed substantially of a substrate, a phosphor layer superposed on the substrate, and a protective layer superposed on the phosphor layer as opposed to the substrate, which intensifying screen is characterized by the fact that the aforementioned phosphor layer comprises a first phosphor layer containing a phosphor represented by the general formula (I):

(wherein M stands for at least one divalent metal element selected from the group consisting of Be, Mg, Ca, Sr, Ba, Zn, and Cd, Ln for at least one element selected from the group consisting of Y, Gd, La, and Lu, D for either or both of Ta and Nb, R for at least one member selected from the group consisting of Tm, Pr, Sm, Eu, Tb, Dy, Yb, and self-activators, a for a value satisfying the expression, $0 < a \leq 1$, and x for a value satisfying the expression, $0 \leq x \leq 0.05$) and formed on the aforementioned substrate side and a second phosphor layer containing $CaWO_4$ and formed on the aforementioned protective layer side.

The present invention succeeds in obtaining an intensifying screen of excellent quality by coating the first phosphor layer possessing a phosphor respresented by the aforementioned general formula (I) and the second phosphor layer possessing $CaWO_4$ jointly to serve as a phosphor layer thereby enabling the insufficient granularity manifested solely by the first phosphor layer to be compensated by the second phosphor layer and, at the same time, enabling the insufficient luminance and sharpness manifested solely by the second phosphor layer to be compensated by the first phosphor layer.

The phosphor of the aforementioned general formula (I) to be used in the first phosphor layer is desired to have an average particle size in the range of 1 to 20 $\mu m$. If the average particle size is less than 1 $\mu m$, there ensues a disadvantage that the phosphor does not produce sufficient sensitivity. Conversely, if this average particle size exceeds 20 $\mu m$, the phosphor suffers from extremely inferior granularity.

The $CaWO_4$ to be used in the second phosphor layer is desired to have an average particle size in the range of 0.5 to 10 $\mu m$. If this average particle size is less than 0.5 $\mu m$, there ensues a disadvantage that the transmittance relative to the light emitted from first phosphor layer is too low to provide sufficient sensitivity. Conversely, if it exceeds 10 $\mu m$, the despersing effect with respect to the light emitted from the first phosphor layer is too small to provide effective improvement of granularity.

The thickness of the first layer is desired to fall in the range of 30 to 300 $\mu m$. Then, the thickness of the second phosphor layer is desired to be in the range of 10 to 100 $\mu m$.

The intensifying screen of the present invention can be produced, for example, by applying a slurry composition consisting essentially of the phosphor, $CaWO_4$, solvent such as n-butyl acetate and a binding agent on a protective film made of polyester film or cellulose acetate film by the doctor blade method, drying the applied layer of the composition thereby forming the second phosphor layer, then applying thereon a composition consisting essentially of the phosphor of the aforementioned general formula (I) solvent such as n-butyl acetate and a binding agent in the same manner as described above, drying the applied layer of the composition thereby forming the first phosphor layer, and finally joining thereto a substrate made such as of polyester.

DETAILED DESCRIPTION OF PREFERRED EMBODIMENTS

Now, the present invention will be described more specifically below with reference to the working examples.

EXAMPLE 1

A slurry was prepared by mixing and dissolving 20 parts by weight of a phosphor of $CaWO_4$ having an average particle size of 2 μm and 2 parts by weight of nitrocellulose as a binding agent in 78 parts by weight of butyl acetate. This slurry was applied on a protective film made of polyester and having a thickness of 10 μm by the doctor blade method. The layer of the slurry so applied on the protective film was dried to produce a second phosphor layer 30 μm in thickness and 15 mg/cm² in density of application.

Then, another slurry was prepared by dispersing and dissolving 20 parts by weight of a phosphor measuring 5 μm in average particle size, composed of 0.15 mol of SrO, 0.95 mol of $Y_2O_3$, and 1 mol of $Ta_2O_5$, and represented by the formula, $Sr_{0.075}Y_{0.95}TaO_4$ (meeting the general formula (I), on the condition that a=0.075 and x=0) and 2 parts by weight of nitrocellulose as a binding agent in 78 part by weight of butyl acetate. On the aforementioned phosphor layer, this slurry was applied by the same method as described above and the applied layer of the slurry was dried to give rise to a first phosphor layer 100 μm in thickness and 45 mg/cm² in density of application.

Thereafter, a substrate of polyester 250 μm in thickness was superposed on the aforementioned phosphor layer to complete an intensifying screen.

When the intensifying screen thus obtained was set in a cassette and radiographed on a regular film (Sakura A), it exhibited sensitivity equivalent to the sensitivity of the intensifying screen (using $CaWO_4$ phosphor) produced by Toshiba and marketed under Code of "E-20." This intensifying screen was further tested for sharpness and RMS granularity by an apparatus produced by Toshiba exclusively for the evaluation of radiographs obtained by use of a intensifying screen. The results are as shown in the following table.

Example 2

An intensifying screen was produced by the same procedure of Example 1, excepting the first phosphor layer thereof was formed by using a phosphor composed of 0.15 mol of SrO, 0.93 mol of $Y_2O_3$, 1 mol of $Ta_2O_5$ and 0.02 mol of $Tm_2O_3$ and represented by the formula, $Sr_{0.075}Y_{0.93}TaO_4:0.02Tm^{3+}$ (meeting the general formula (I), on the condition that a=0.075 and x=0.02). This intensifying screen was similarly tested for sharpness and RMS granularity. The results are as shown in the table.

|  | Example | | |
|---|---|---|---|
|  | 1 | 2 | E-20 |
| Sharpness | 120 | 120 | 100 |
| RMS granularity | 0.020 | 0.021 | 0.023 |

Comparative Experiment 1

An intensifying screen was produced by the same procedure of Example 1, excepting the slurry for the first phosphor layer was obtained by mixing and dissolving 20 parts by weight of a phosphor, $CaWO_4$, 5 μm in average particle size in the place of the phosphor of the formula, $Sr_{0.075}Y_{0.95}TaO_4$, and 2 parts by weight of nitrocellulose as a binding agent in 78 parts by weight of butyl acetate.

The intensifying screen consequently obtained exhibited sensitivity equivalent to the sensitivity of the intensifying screen obtained in Example 1. The sharpness and the RMS granularity of this intensifying screen were 100 and 0.022 respectively.

Comparative Experiment 2

An intensifying screen was produced by the same procedure of Example 1, excepting the phosphor layer of $Sr_{0.075}Y_{0.95}TaO_4$ as used in Example 1 alone was formed in the phosphor layer.

The intensifying screen consequently produced exhibited sensitivity equivalent to the sensitivity of the intensifying screen of Example 1. The sharpness and the RMS granularity of this intensifying screen were 125 and 0.030 respectively.

Comparative Experiment 3

An intensifying screen was produced by the same procedure of Comparative Experiment 2, excepting a phosphor of the formula, $Sr_{0.075}Y_{0.93}TaO_4:0.02Tm^{3+}$, was used instead. The sharpness and the RMS granularity of this intensifying screen were 130 and 0.032 respectively.

As described above, the intensifying screen of the present invention enjoys improved granularity without any decrease of sensitivity or sharpness. When it is used for medical diagnoses, it requires only a small dosage of X-ray to produce a radiograph precise enough to permit accurate analyses necessary for reliable diagnosis. Thus, the intensifying screen fits the radiograph for medical diagnosis.

What is claimed is:

1. X-Ray intensifying screen composed substantially of a substrate, a phosphor layer superposed on said substrate, and a protective layer superposed on said phosphor layer as opposed to said substrate across said phosphor layer, in which said phosphor layer comprises a first phosphor layer containing a phosphor represented by the general formula (I):

$$M_aLn_{1-x-(\frac{a}{3})_a}DO_4:XR^{3+} \quad (I)$$

(wherein M stands for at least one divalent metal element selected from the group consisting of Be, Mg, Ca, Sr, Ba, Zn, and Cd, Ln for at least one element selected from the group consisting of Y, Gd, La, and Lu, D for either or both of Ta and Nb, R for at least one member selected from the group consisting of Tm, Pr, Sm, Eu, Tb, Dy, Yb, and self-activators, a for a value satisfying the expression, $0 < a \leq 1$, and x for a value satisfying the expression, $0 \leq x \leq 0.05$) and formed on said substrate side and a second phosphor layer containing $CaWO_4$ and formed on said protective layer side.

2. The X-Ray intensifying screen of claim 1, wherein said phosphor in said first phosphor layer has an average particle size in the range of 1 to 20 μm and said phosphor in said second phosphor layer has an average particle size in the range of 0.5 to 10 μm.

3. The X-ray intensifying screen of claim 1, wherein a in Formula I has a value satisfying the expression $0 < a < 1$.

4. The X-ray intensifying screen of claim 2, wherein a in Formula I has a value satisfying the expression $0 < a < 1$.

* * * * *